United States Patent [19]

Ney

[11] Patent Number: 4,668,561
[45] Date of Patent: May 26, 1987

[54] CONFECTION MIXING, CHOPPING AND EXTRUDING APPARATUS

[76] Inventor: Robert J. Ney, 2275 E. Bay Dr., Ste. 1103B, Clearwater, Fla. 33546

[21] Appl. No.: 859,477

[22] Filed: May 5, 1986

[51] Int. Cl.⁴ .................. A23G 9/12; A23G 9/28; B29C 47/36
[52] U.S. Cl. ......................... 425/202; 222/231; 222/239; 222/386; 366/184; 425/289; 425/376 R
[58] Field of Search ............... 366/184; 222/231, 239, 222/386; 425/376 R, 200, 202, 289

[56] References Cited

U.S. PATENT DOCUMENTS

| | | | |
|---|---|---|---|
| 2,990,978 | 7/1961 | Charos | 222/386 |
| 3,323,570 | 6/1967 | Tullock et al. | 425/202 |
| 3,572,556 | 3/1971 | Pogacar | 222/386 |
| 4,448,114 | 5/1984 | Mayer | 425/200 |
| 4,548,508 | 10/1985 | Verckler | 425/200 |

*Primary Examiner*—Willard E. Hoag

[57] ABSTRACT

Apparatus for converting a serving of hard ice cream to soft ice cream with additions of fruit, flavoring, nuts, etc. as desired. The apparatus includes a cup having an extrusion nozzle and containing rotatable cutting and mixing means rotated by retractable pins of a rotatable and retractible piston which not only rotates the cutter but also forces the ice cream from the nozzle of the cup.

13 Claims, 5 Drawing Figures

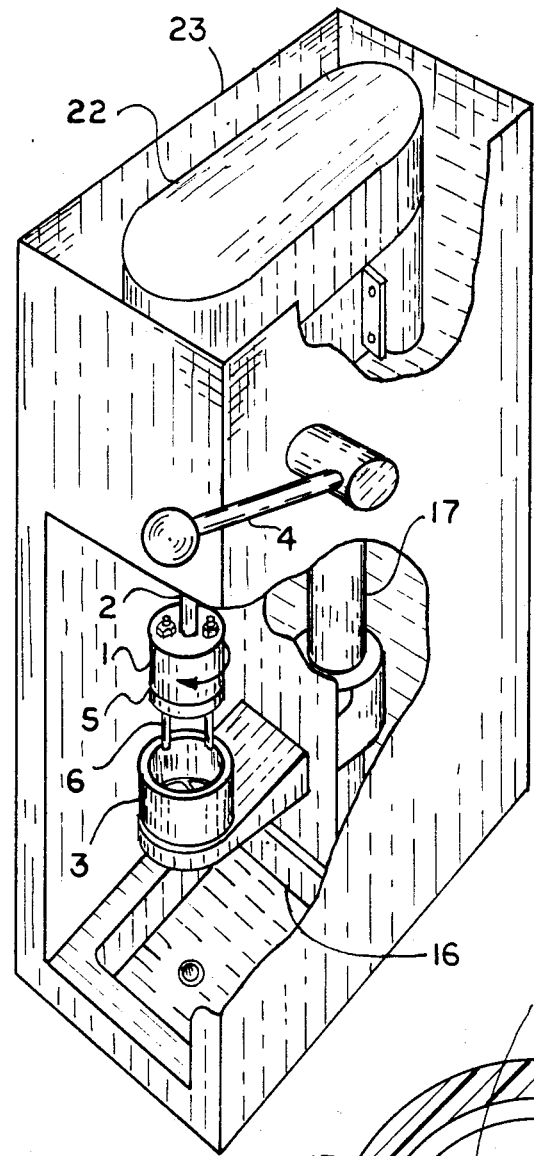
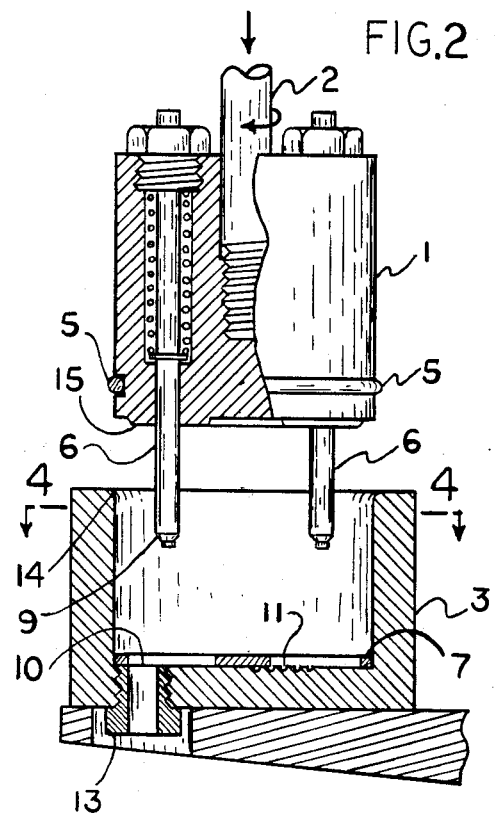
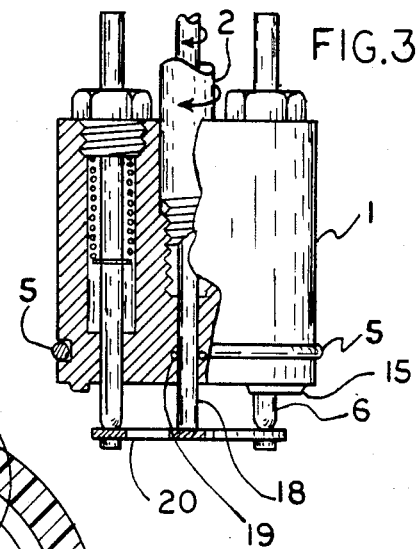
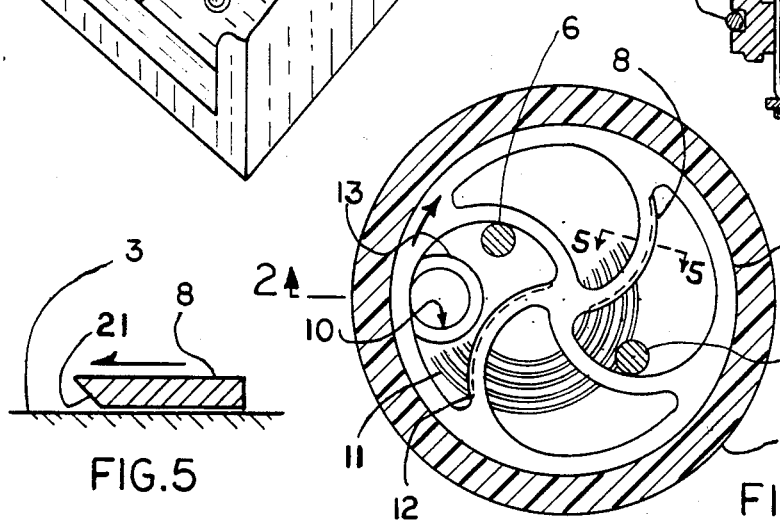

CONFECTION MIXING, CHOPPING AND EXTRUDING APPARATUS

BACKGROUND OF THE INVENTION

There has been a considerable demand for "soft-serve" ice cream, that is extruded out of a nozzle at about 18 degrees F., as opposed to "hard" ice cream at about 8 degrees F. Soft ice cream is actually more tasty than the similar "dip-serve" hard product because it does not freeze and numb the taste buds as much.

Unfortunately, the best equipment that is most commonly used for the "soft-serve" product is expensive; it is actually a batch-freezer (or ice cream machine) which is used to make the basic ice cream, that is subsequently hardened in a deep-freezer. Such machine has an agitator chamber and a refrigerator, and it serves usually one flavor. Soft ice cream spoils much faster than hard ice cream, and the consistency becomes gummy. These machines should be dumped out, and cleaned every night. Only high volume establishments can afford to buy and operate these machines.

For these reasons, there have been attempts to introduce low cost machines that convert hard ice cream to soft ice cream by single servings. There are a number of other very significant advantages of this process, that are obvious to those skilled in the art, namely: the flavoring can be introduced into a vanilla, chocolate, or unflavored ice cream base, at the hard to soft conversion process, thereby greatly reducing the storage facility requirements for various flavors. A fresh product is obtained even for the "low" demand flavors, while hundreds of flavor combinations become practical to make!

There are a number of machines on the market that soften, mix, chop, and extrude the ice cream product. All of them are substantially improvements on a conical auger type apparatus patented by C A Reed, (U.S. Pat. No. 2,626,133; January 1953). These machines have not been very popular for a number of reasons, not the least of these were their complexity and cost. It is most unfortunate since it puts out an excellent product, particularly the cookie additions are unsurpassed since they are fresh and crisp, not soggy as in hard ice cream.

In the last few years, however, there has been an increased interest in these machines, to serve frozen yoghurt dessert, and to mix and chop fresh fruits, nuts, cookies, and candy, into the product. The fruit aggregate additions are soft and tasty, not frozen (icy), as in ordinary fruit ice cream.

BRIEF DESCRIPTION

The subject invention utilizes a piston and cylinder arrangement for pressuring the product for extrusion, retractable stirring rods in a rotating piston for softening and mixing, and a rotating cutter at the entrance to the nozzle orifice, for chopping up the aggregates.

The auger type machine has a relatively large axial force component along the drive shaft, since the auger has a relatively large surface area and a considerable mechanical advantage, tending to drive it out of a slick viscous product. The operator is counter-acting much of the motor torque. Axial reaction forces of up to 300 pounds were measured, hence the need for a relatively heavy frame, large motor, and complex actuating mechanism. The subject rotating piston apparatus mixes by exerting substantially radial forces only on the product, hence the first order reaction forces are completely contained within the frame structure of the machine. There is only a second order shaft axial force produced due to the mixing action, which is caused by the fluid friction around the stirring rods. The magnitude of the total pressure (static and dynamic) of the fluid in front of the stirring rods is larger than the magnitude of the total negative pressure behind the stirring rods, due to fluid frictional pressure losses around the rods. This pressure difference results in a relatively small pressure on the face of the piston, during mixing. The axial force was measured to be under 3 ounces, for $\frac{1}{4}$ in. dia. stirring rods, at the worst conditions of mixing speed and fluid viscosity.

Unlike that in the case of the auger type devices, the subject machine's mixing and extrusion functions are completely independent. In other words the subject piston/cylinder machine can mix without extruding, and extrude without mixing. This is a very useful property, as it will be shown later. The piston axial reaction force is determined essentially only by the fluid flow frictional forces at the output orifice. The parameters of the frictional forces are: orifice diameter and length, fluid viscosity, and flow velocity. The force required to extrude a typical 5 ounce charge in 10 seconds, was measured to be 12 pounds. With a 15:1 leverage ratio actuator, the handle bar force was 0.8 pounds, which is quite practical, even for a feeble operator.

There is also a considerable cost advantage of the subject machine, since the piston is driven by a high grade commercial drill press. These drill presses are relatively inexpensive and quite reliable.

DESCRIPTION OF THE DRAWINGS

FIG. 1 is a perspective elevational view of the whole apparatus, with part of the cabinet broken out.

FIG. 2 is a partially broken out elevational view of the rotating piston and cylindrical cup, in their relative positions before engagement; with the stirring rods in the extended position.

FIG. 3 is a partially broken out elevational view of the rotating piston, with an independently driven cutter shaft, shown in a partially retracted position. The stirring rods are also shown in a partially retracted position.

FIG. 4 is a top view of the cutter, with four circular spokes, the exit orifice, and the concentric circular grooves in the bottom of the cylindrical cup. The stirring rods to cutter spokes engagement locations are shown.

FIG. 5 is an elevational view of the cross section of the cutter spoke, with a beveled leading edge, in the proximity of the bottom of the loading cup.

DETAILED DESCRIPTION

Referring to FIGS. 1 and 2, in the preferred embodiment of this invention, piston 1 is mounted on (drill press) spindle shaft 2, said piston 1 engages and traverses into cylindrical loading cup 3, when actuating lever 4 is moved counter-clockwise. Piston 1 and cup 3 are made preferably of white color, high impact and heat resistant plastic. The piston seals 5 are rubber "O" rings, mounted in appropriate grooves on the circumference of piston 1. The two stirring rods 6 are made of high chrome/nickel steel. They are nested in piston 1 and are spring loaded out of the nesting position. Stirring rods 6 are oriented parallel with spindle shaft 2, at 180 degrees apart, extending down from the bottom face of piston 1. As piston 1 traverses into cup 3, stirring rods 6 engage the bottom of cup 3, and are pushed back into the nested position. There is a thin circular cutter 7 with preferably four spokes 8 (FIG. 4), which is free "floating" on the bottom surface of cup 3, restricted only by the cylinder wall, and (ice cream) capillary forces between the cutter 7 and the bottom surface of cup 3. Stirring rods 6 have a conical lip 9 at their tips, said tips engage two spokes 8 of the cutter 7, and rotatively drive it. Said conical lips 9 also force the cutter against the bottom surface of cup 3, when they are engaged in rotation. The spokes 8, have the shape of an involute, or a circular segment, to drive the aggregate in the product radially outward, toward the exit nozzle orifice 10 which is located on the bottom plane of cup 3, near the cylindrical wall. Concentric involute, or concentric circular shaped shallow grooves 11 are cut into the bottom surface of loading cup 3 (FIG. 4), in the vicinity of the exit orifice 10. These grooves 11 co-operating with the curved spokes 8, and with the bottom surface of piston 1, drive the aggregates in the product, into exit orifice 10. The intersection 12 of spokes 8 with grooves 11 form angles 90 degrees or greater, this results in a positive radial drive. All the product extruded must pass thru said orifice 10, hence this is an ideal location for the chopping action. A scissors type cutting action occurs between the cutter spokes 8 and the exit orifice 10. Coarse chopping is done by stirring rods 6. First order machine parameters for the final aggregate size are: The number of spokes in the cutter, the ratio of cutter speed to extrusion speed, and the orifice diameter. These parameters are relatively easy to control. Actually, in the second preferred embodiment of this invention, where cutter 7 is driven independently of the stirring rods 6, chopping and extruding may be accomplished without mixing, by shutting off the stirring rod 6 drive. In this mode of operation there is substantially no change in the viscosity of the extruded product, from front to tail end, since no work energy is added to the product by the stirring rods. This mode of operation is, of course, not possible with the auger type machines, where both extruding and mixing functions are accomplished by the auger.

Both cutter 7 and output nozzle 13, are preferably made of precipitation hardened chrome steel, and ground at the mating surface planes. The circular rim outside diameter of cutter 7, is just a few thousandths of an inch smaller than the cylindrical cup 8 bore diameter, hence cutter 7 is well guided.

For a single serving of up to 6 ounces of product, a cup 3 effective volume of about 19 cubic inches is required. This can be obtained with a cup 3 bore of 3 inches, and a depth of 2.7 inches.

For simplicity, piston 1 can be provided with only one "O" ring seal 5, with a compression of about 20% of the "O" ring body diameter. There will be a slight amount of leakage of the product, past said "O" ring seal 5, this is necessary for purposes of lubrication. Incidentally, ice cream is an excellent lubricant. If a better seal is desired, two "O" rings may be placed in close proximity on piston 1, and the "O" ring body compression may be reduced to about 15%. It is necessary to provide an entrance funnel 14, at the open end of cup 3, in order to be able to insert and compress the "O" ring seals 5 properly, into cup 3. The cylinder walls of cup 3, should be highly polished, in order to reduce wear on the "O" ring seals 5.

Other important parameters in the operation of the subject device are cleaning and waste, which are somewhat related. The material that is left in the device from a batch of product is wasted and it has to be cleaned out. For these reasons it is highly advantageous to minimize the waste. The subject piston and cylinder device is inherently well adopted to low waste, since the "O" ring seals 5 wipe the cylinder walls quite well, and the surface area of the piston and cylinder is relatively small. The major amount of product residue occurs at the bottom of the cup 3. Attempts are made in the design to displace as much of the cylinder volume as practical by the piston. In the preferred embodiment of this invention, the bottom surface of piston 1 contains protrusions 15, shaped such that they closely fit into the volume between spokes 8 of cutter 7. Since said piston 1 and cutter 7 are always keyed together in the drive condition, by the stirring rods 6, this can be accomplished. Hence, the residue in this volume is forced out into the output orifice by the interaction of protrusions 15 on the bottom surface of piston 1, the curved cutter arm 8, and the concentric involute, or concentric circular grooves 11, on the bottom surface of cup 3.

A water spray nozzle is provided for rinsing cup 3 and piston 1; also draining pan 16 is provided at the bottom of the support stand 17, for catching and draining the rinse water.

A micro-switch and cam arrangement is used to energize the drive motor, of piston 1, only when piston 1 "O" ring seals 5 are engaging ice cream loading cup 3. Conversely this switch de-energizes said motor, when piston seals 5 dis-engage cup 3.

In the embodiment of FIG. 3 cutter 7 is independently driven by shaft 18, said shaft passing thru the axis of piston 1 and spindle shaft 2, and said shaft 18 is sealed with "O" rings 19, nested in grooves in piston 1. In this version the tips of stirring rods 6 are rounded, and are made to engage the circular rim of cutter drive disc 20.

In order to obtain a fine grinding action in this device, for the aggregate additions, the leading edges of some of the cutter spokes 8 contain a bevel 21 (FIG. 5). This causes some of the smaller aggregate additions in the charge to be forced between said spoke 8 and the bottom surface of loading cup 3, and a smashing or grinding action results. It is emphasized that cutter 7 may be driven by a shaft from below cup 3 also. Foods such as puddings and stuffed potatoes may also be processed in this apparatus. These items should be considered to be within the scope of this invention.

Drill press 22, which drives spindle shaft 2 rotatively and axially, and supports ice cream loading cup 3, is enclosed in a plain stainless steel cabinet 23, normally used in the food industry.

It is noted that a significant amount of energy is saved by the implementation of the above system of ice cream dispensing, since only a small 4 position dipper cabinet is required to operate, for the base ice cream stock, even for a relatively large operation. A 24 or 32 position dipper display cabinet is commonly used now. These cabinets are typically poorly insulated on the top; also their refrigerators usually dump the heat into the building space, so that it greatly increases the air conditioning load. In the proposed system, the flavoring addatives would be displayed in small trays, on a 40 degree F. refrigerated display counter top.

In my own parlor, 10% to 15% of the ice cream stock gets discarded because some flavors do not sell as well as expected, and become spoiled. This loss should be substantially reduced, withthe proposed system of ice cream dispensing.

It will be appreciated by those skilled in the art, that this invention may take various embodiments other than the illustrative embodiments heretofore described. Accordingly, I intend by the following claims to cover all modifications within the spirit and scope of my invention.

What I claim is new, and desire to secure by Letters Patent of the United States is:

1. A food mixing chopping and extruding apparatus comprising a piston and a cylindrical cup for pressurizing the product for extrusion with retractable stirring devices extending into said cylindrical cup said cup containing an extrusion nozzle in its wall and a rotatable cutter in said cup.

2. The apparatus as described in claim 1, wherein there is a cutter moving in front of said nozzle entrance orifice for chopping up aggregate additions.

3. The apparatus as described in claim 2, wherein said piston has said retractable stirring arms extending from its bottom surface and said piston is rotatively driven about its axis.

4. The invention as described in claim 3, wherein the bottom surface of said piston conforms to the volume between spokes of said cutter so that at full diplacement of said piston the un-displayed cylinder volume is minimized.

5. The invention as described in claim 3 wherein said cutter engages and is driven by said stirring arms.

6. The invention as described in claim 3 wherein said cutter is movable by an independent motor shaft.

7. The invention as described in claim 5 wherein said food is a frozen confection.

8. The invention as described in claim 6 wherein said food is a frozen confection.

9. The apparatus as described in claim 5 wherein grooves are located on the bottom surface of said cylindrical cup co-operating with said cutter spokes and with said piston bottom surface to move the aggregates in the product into the exit orifice.

10. The apparatus as described in claim 6 wherein grooves are located on the bottom surface of said cylindrical cup co-operating with said cutter spokes and with said piston bottom surface to move the aggregates in the product into the exit orifice.

11. The apparatus as described in claim 9 wherein said cutter spokes are curved.

12. The apparatus as described in claim 10 wherein said cutter spokes are curved.

13. The invention as described in claim 2 wherein some of the spokes of said cutter have a beveled leading edge in order to force some of the aggregates under said spoke and develop a grinding action with the bottom of said cylindrical cup.

* * * * *